United States Patent [19]

Geibel et al.

[11] Patent Number: 5,066,774

[45] Date of Patent: Nov. 19, 1991

[54] METHOD FOR THE PRODUCTION OF LIGHT COLORED AROMATIC SULFIDE/SULFONE POLYMERS WITH 1,3-DIALKYL-2-IMIDAZOLIDINONE DILUENT

[75] Inventors: Jon F. Geibel; Rex L. Bobsein; Harold D. Yelton, all of Bartlesville, Okla.

[73] Assignee: Phillips Petroleum Company, Bartlesville, Okla.

[21] Appl. No.: 587,836

[22] Filed: Sep. 25, 1990

Related U.S. Application Data

[63] Continuation of Ser. No. 458,043, Dec. 28, 1989, abandoned.

[51] Int. Cl.$^5$ ............................................. C08G 75/20
[52] U.S. Cl. ................................... 528/388; 528/171; 528/174; 528/391
[58] Field of Search ................ 528/388, 391, 171, 174

[56] References Cited

U.S. PATENT DOCUMENTS

| | | | |
|---|---|---|---|
| 3,354,129 | 11/1967 | Edmonds et al. | 260/79 |
| 3,919,177 | 11/1975 | Campbell | 260/79.1 |
| 4,125,525 | 11/1978 | Campbell | 528/388 |
| 4,501,884 | 11/1985 | Ostlinning et al. | 528/388 |
| 4,774,276 | 9/1988 | Bobsein et al. | 524/399 |
| 4,808,698 | 2/1989 | Bobsein et al. | 528/388 |

*Primary Examiner*—Harold D. Anderson
*Attorney, Agent, or Firm*—Beverly M. Dollar

[57] ABSTRACT

This invention provides a process to produce aromatic sulfide/sulfone polymers exhibiting high molecular weight, and having a light or "whitish" coloration. This process employs a dihaloaromatic sulfone, a sulfur-containing compound and a 1,3-dialkyl-2-imidazolidinone. These lighter colored polymers are more preferable commercially and may be useful in the production of coatings, films, molded objects, and glass or carbon fiber composites.

10 Claims, No Drawings

METHOD FOR THE PRODUCTION OF LIGHT COLORED AROMATIC SULFIDE/SULFONE POLYMERS WITH 1,3-DIALKYL-2-IMIDAZOLIDINONE DILUENT

CROSS-REFERENCE TO RELATED APPLICATION

This application is a continuation of prior application, Ser. No. 07/458,043, filed Dec. 28, 1989, now abandoned.

BACKGROUND OF THE INVENTION

The process for the production of high molecular weight aromatic sulfide/sulfone polymers by reacting a dihalo aromatic sulfone and a selected alkali metal sulfide, in the presence of an alkali metal carboxylate and a sulfone diluent is outlined in U.S. Pat. No. 4,125,525, issued to Phillips Petroleum Company on Nov. 14, 1978.

One important characteristic needed for the commercialization of such polymers is color. The lighter colored, or more "whitish" polymers are more preferred for some purposes. Thus, a method for producing high molecular weight aromatic sulfide/sulfone polymers which are lighter in color than the polymers produced in the prior art would represent a significant advancement in the art.

Accordingly, an object of this invention is to provide a process to produce aromatic sulfide/sulfone polymers exhibiting high molecular weight, and having a light or "whitish" coloration.

This and other objects, as well as the several advantages of this invention, will be apparent from the study of this disclosure and the appended claims.

In accordance with this invention, we have discovered that if in the production of an aromatic sulfide/sulfone polymer by employing a dihalo aromatic sulfone, a sulfur-containing compound selected from a group consisting essentially of alkali metal sulfides and alkali metal hydrosulfides, and hydrogen sulfide, there is employed a 1,3-dialkyl-2-imidazolidinone such as 1,3-dimethyl-2-imidazolidinone, as the polymerization diluent there is produced a high molecular weight aromatic sulfide/sulfone polymer which is lighter in color.

Thus, in one presently preferred embodiment of this present invention, at least one dihalo aromatic sulfone such as bis(p-halophenyl) sulfone, a sulfur-containing compound, at least one alkali metal carboxylate, 1,3-dimethyl-2-imidazolidinone and water are contacted under polymerization conditions for a period of time sufficient to form an aromatic sulfide/sulfone polymer.

Dihalo aromatic sulfones that may be employed in the process of this invention can be represented by the formula

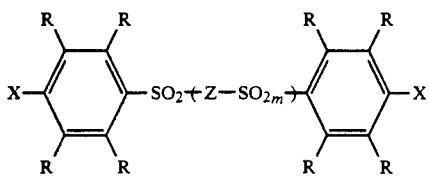

where each X is selected from the group consisting of fluorine, chlorine, bromine, and iodine, Z is a divalent radical selected from the group consisting of

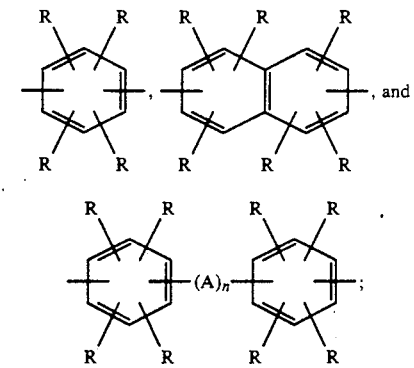

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, m is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 2,6-bis(bromophenylsulfonyl)napthalene, 7-ethyl-1,5-bis(p-iodophenylsulfonyl)naphthalene, 4,4′-bis(p-chlorophenylsulfonyl)biphenyl, bis[p-(p-bromophenylsulfonyl)phenyl] ether, bis[p-(p-chlorophenylsulfonyl)phenyl]sulfide, bis[p-(p-chlorophenylsulfonyl)phenyl]sulfone, bis[p-(p-bromophenylsulfonyl)phenyl]methane, 5,5-bis[3-ethyl-4-(p-chlorophenylsulfonyl)phenyl]nonane, and the like and mixtures thereof.

Any suitable sulfur source can be employed according to our invention. For example, U.S. Pat. No. 3,919,177 discloses a wide variety of suitable sulfur sources which can be utilized in the preparation of poly(arylene sulfide) polymers. Suitable sources of sulfur which can be employed to prepare the poly(arylene sulfide/sulfone) polymers useful in this invention are hydrogen sulfide, alkali metal sulfides, alkali metal hydrosulfides and thioamides. It is preferred to employ an alkali metal sulfide or alkali metal hydrosulfide as the sulfur source.

Examples of suitable alkali metal sulfides include sodium sulfide, potassium sulfide, lithium sulfide, rubidium sulfide, and cesium sulfide. Examples of suitable alkali metal hydrosulfides include sodium hydrosulfide, potassium hydrosulfide, lithium hydrosulfide, rubidium hydrosulfide, and cesium hydrosulfide.

If hydrogen sulfide or an alkali metal hydrosulfide or a thioamide is employed as the sulfur source, it is preferred to also employ an alkali metal hydroxide. The preferred alkali metal hydroxide is sodium hydroxide because of cost and availability and generally good results obtained therewith.

It is optional to employ a base in the preparation of poly(arylene sulfide/sulfone) polymers. Suitable bases according to this optional feature are alkali metal hydroxides, alkali metal carbonates, and mixtures of alkali metal hydroxides with alkali metal carbonates. Suitable alkali metal hydroxides include lithium hydroxide, sodium hydroxide, potassium hydroxide, rubidium hydroxide, and cesium hydroxide. Suitable alkali metal carbonates include lithium carbonate, sodium carbonate, potassium carbonate, rubidium carbonate, and cesium carbonate.

When a base is employed according to this optional feature of our invention, the molar ratio of said base to the sulfur-containing compound is about 0.5:1 to 4:1, preferably about 0.5:1 to about 2.05:1.

Alkali metal carboxylates that can be employed in the process of this invention can be represented by the formula $R'CO_2M$ where $R'$ is a hydrocarbyl radical selected from the group consisting of alkyl, cycloalkyl, and aryl, and combinations thereof such as alkaryl, aralkyl, and the like, the number of carbon atoms in said $R'$ being within the range of 1 to about 20, and M is an alkali metal selected from the group consisting of lithium, sodium, potassium, rubidium, and cesium. Preferably, $R'$ is an alkyl radical having 1 to about 6 carbon atoms or a phenyl radical and M is sodium. If desired, the alkali metal carboxylate can be employed as a hydrate or as a solution or dispersion in water.

Examples of some alkali metal carboxylates that can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium m-toluate, lithium phenylacetate, sodium 4-phenylcyclohexanecarboxylate, potassium p-tolylacetate, lithium 4-ethylcyclohexylacetate, and the like, and mixtures thereof.

The polymerization diluent is one or more 1,3-dialkyl-2-imidazolidinones, and is shown by the structure;

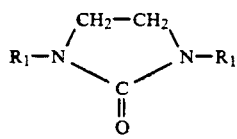

where $R_1$ is selected from alkyl groups having 1 to about 8 carbon atoms. Examples are:
1,3-dimethyl-2-imidazolidinone
1,3-diethyl-2-imidazolidinone
1,3-dipropyl-2-imidazolidinone
1,3-dibutyl-2-imidazolidinone
1,3-dihexyl-2-imidazolidinone
1,3-dioctyl-2-imidazolidinone and the like and mixtures thereof.

The currently preferred diluent is 1,3-dimethyl-2-imidazolidinone (DMI).

The aromatic sulfide/sulfone polymers produced by the process of this invention can be characterized as having recurring

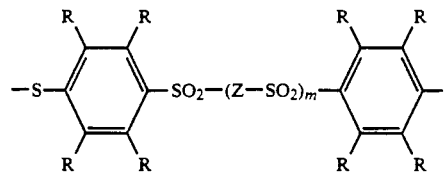

units, where each R, Z, and m is as defined above.

Although the mole ratio of dihalo aromatic sulfone to sulfur-containing compound can vary over a considerable range, generally it will be within the range of about 0.9:1 to about 2:1, preferably about 0.95:1 to about 1.2:1. The mole ratio of alkali metal carboxylate to sulfur-containing compound can vary over a wide range but generally will be within the range of about 0.05:1 to about 4:1, preferably about 0.1:1 to about 2:1. The molar ratio of 1,3-dialkyl-2-imidazolidinone diluent to sulfur-containing compound can vary greatly, generally being within the range of about 2:1 to 24:1, preferably about 4:1 to 16:1.

Although the reaction temperature at which the polymerization is conducted can vary over a considerable range, generally it will be within the range of about 120° C. to about 240° C., preferably about 180° C. to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and the 1,3-dialkyl-2-imidazolidinone diluent substantially in the liquid phase.

It is to be understood that the process of this invention can be carried out by mixing the dihalo aromatic sulfone, the sulfur-containing compound, the alkali metal carboxylate, water, base, if used, and the 1,3-dialkyl-2-imidazolidinone diluent in any order. It is also to be understood that a composite can be formed of any two or more of these substances with the remaining substance or substances being introduced into the composite. Furthermore, it is to be understood that these substances can be employed in the form of aqueous mixtures of hydrates and that subsequent to any step of contacting substances, water can be removed from the resulting composition, e.g., by heating, distilling, and the like. For instance, water can be removed by distillation from a mixture of the 1,3-dialkyl-2-imidazolidinone diluent, an alkali metal carboxylate, and the sulfur-containing compound in hydrated form or as an aqueous mixture, after which the residual mixture can be admixed with the dihalo aromatic sulfone and the resulting mixture then maintained at polymerization conditions. In a presently preferred embodiment, the dihalo aromatic sulfone, the sulfur-containing compound, the alkali metal carboxylate, and the 1,3-dialkyl-2-imidazolidinone diluent are combined to form a mixture which is heated at an elevated temperature for a period of time sufficient to form an aromatic sulfide/sulfone polymer.

The melt stable polymer may also be prepared by contacting a poly(arylene sulfide sulfone) (PASS) with a zinc source at a temperature and pressure for a period of time sufficient to incorporate enough zinc cations to improve the melt stability of the polymer.

Generally, the polymers are contacted with the zinc source at a temperature of about 0° C. to 300° C. Preferably the polymers are contacted with the zinc source at a temperature of about 100° C. to 200° C., at a pressure of about 15 to 1500 psia, for a time ranging from about ½ minute to 3 hours.

When the polymer is contacted with the zinc source during polymerization the normal reaction conditions need not be varied.

The amount of the zinc source added to contact the polymer can vary depending upon the qualities desired in the final treated polymer. Generally the amount of zinc compound used to contact the polymer will be within the range of about 0.01 to 10 preferably about 0.25 to 2 weight percent based on the total weight of the polymer.

The time for contacting the polymers with the zinc source can vary widely, depending, in part, on the temperature and the nature of the polymers. The contacting time generally will be within a range of about 30 seconds to 3 hours, preferably from about 1 minute to 1 hour. When a soluble zinc compound is employed the pressure should be sufficient to maintain liquid phase conditions which can range from about 0 to 1,500 psia. Repeated treatments can be employed, if desired, and the process can be carried out in several stages, if desired.

When a soluble zinc source is used it is preferably a zinc salt. The concentration of the zinc salt preferably ranges from 0.001 weight percent up to the solubility limits of the particular salt employed. Preferably, the zinc salt in solution is in the range of about 0.1 to 5 weight percent.

The heating and contacting with the soluble zinc source can be carried out with conventional equipment. A convenient method for carrying out the process is to contact the polymers and zinc salt in an enclosed tank provided with agitation. The contacting can be carried out in a single vessel or with a plurality of vessels. The polymers can be separated from the reaction product after contacting by suitable techniques including pressure reduction to atmospheric, filtration, and the like. The polymers are subsequently washed and/or dried for further use as desired.

When the zinc source is not contacted with the polymer in solution, some of the contacting conditions will be quite different from solution contacting conditions.

When a zinc source is melt mixed with the polymer the concentration of the zinc source is any amount sufficient to incorporate enough zinc cations into the polymer to improve the melt stability of the polymer. When the zinc source is zinc oxide this amount will preferably be within the range of about 0.1 to 5, more preferably about 0.2 to 1, and most preferred about 0.3 weight percent based on the total weight of the polymer composition.

Melt mixing the polymer with the zinc source is preferably conducted at ambient pressure at a high enough temperature for a period of time sufficient to melt the polymer and mix in the zinc source to incorporate zinc cations into the polymer. Melt mixing the polymer with the zinc source is preferably conducted at a temperature between about 330° C. and 370° C. for a period of time between about 3 seconds and 10 minutes. More preferably the period of time to melt mix the polymer with the zinc source is between about 3 and 10 seconds at the polymer's melting temperature.

The aromatic sulfide/sulfone polymers produced by the process of this invention can be separated from the reaction mixture by conventional procedures, e.g., by filtration of the polymer, followed by washing with water, or by dilution of the reaction mixture water, followed by filtration and water washing of the polymer. If desired, at least a portion of the washing with water can be conducted at an elevated temperature, e.g., up to about 250° C. Optionally, the washing with water can be used in conjunction with washing with a water-miscible solvent such as methanol.

The aromatic sulfide/sulfone polymers produced by the process of this invention can be blended with fillers, pigments, extenders, other polymers, and the like. They can be cured through an oxidative heat treatment, e.g., by heating at temperatures up to about 480° C. in the presence of a free oxygen-containing gas, to provide cured products having high thermal stability and good chemical resistance. Both cured and uncured polymers of pass are useful in the production of coatings, films, molded objects, and glass or carbon fiber composites.

EXAMPLES

In the following examples, values for the PPSS inherent viscosity (IV) in dL/g were determined at 30° C. at a concentration of 0.25 g/50 ml in N-methyl-2-pyrrolidone (NMP). PPS IV values were determined at 206° C. in 1-chloronaphthalene at a concentration of 0.4 g/100 ml. Melt flow (MF) values for PPSS were determined by the method of ASTM D-1238, Procedure B Automatically Timed Flow Rate Measurement under Condition 345/5.0 modified to employ a 5 minute preheat. Extrusion rates for PPS were determined under Condition 316/0.345 using an orifice having the dimensions of 2.095 plus or minus 0.005 mm diameter and 31.75 plus or minus 0.05 mm length.

The following examples are presented in further illustration of the invention and are not to be construed as unduly limiting the scope of the invention.

EXAMPLE I

This example is a control example that demonstrates the ineffectiveness of 1,3-dimethyl-2-imidazolidinone (DMI) as a diluent for a polyphenylene sulfide (PPS) polymerization compared with N-methyl-2-pyrrolidone (NMP). A polymer was prepared in a stirrer-equipped, 1-liter autoclave by charging 1.0 g-mole sodium hydrosulfide (NaSH) (as a 59 weight percent aqueous solution), 1.05 g-mole sodium hydroxide (NaOH), and 2.5 g-mole NMP and flushing the autoclave with nitrogen. The autoclave temperature was raised to 208° C. and water was removed by distillation. The autoclave was cooled and 1.03 g-mole of p-dichlorobenzene (DCB) was added to the autoclave at 150° C. After heating the mixture to 245° C. and holding the temperature for three hours, the autoclave was cooled and opened to remove the crude polymer.

The aqueous polymer slurry was filtered and washed several times with distilled water. After suspending the filtered, washed PPS polymer six times with hot (95° C.) water, the final material was filtered and dried for three days at 70° C. The dried PPS product had an extrusion rate of 60 g/10 min. and an I.V. of 0.15 dL/g.

Another reaction was carried out as described above except that 2.5 g-mole of DMI was used in place of NMP. The dehydration was carried out at 160°–179° C. and the DCB was added in 1 g-mole of DMI. When the autoclave was opened, the product appeared to be low molecular weight and there was a distinctive DCB odor. The product was washed exhaustively with water and dried under a nitrogen flush in a vacuum. A thin layer chromatography separation of the product showed spots typical of PPS oligomers. An elemental analysis showed that the product was very high in chlorine, typical of low molecular weight PPS. The PPS polymerization product made using DMI as a diluent was much lower in molecular weight than the product made with NMP as a diluent.

EXAMPLE II

Another control run was made using NMP as the diluent for a PPSS polymerization. 0.2525 g-mole bis(p-chlorophenyl) sulfone, 0.3125 g-mole sodium carbonate ($Na_2CO_3$), 0.25 g-mole sodium acetate, 0.25 g-mole NaSH (as a 58.76 weight percent aqueous solution), 2.0 g-mole NMP, and 1.5 g-mole water were charged to a stirrer equipped, 1-liter autoclave, which was then flushed with nitrogen. The resulting mixture was heated to 200° C. and held for 3 hours at 200° C. at a pressure of 160 psig. At the end of the 3 hour polymerization cycle, a mixture of 1.26 g-mole of NMP and 2.8 g-mole of water was added to the autoclave. The polymer product was washed with hot (80°–90° C.) water several times and vacuum dried overnight at 170° C. The polymer was brownish-tan in color and had an I.V. of 0.51 dL/g. An attempted melt flow determination resulted in a 0 MF and a brown extrudate with considerable voids.

EXAMPLE III

In a polymerization run within the scope of the present invention, 0.2525 g-mole bis(p-chlorophenyl) sulfone, 0.3125 g-mole $Na_2CO_3$, 0.25 g-mole sodium acetate, 0.25 g-mole NaSH (as a 58.76 weight percent aqueous solution) 2.0 g-mole 1,3-dimethyl-2-imidazolinone (DMI) and 1.5 g-mole water were charged to a stirrer equipped, 1-liter autoclave, which was then flushed with nitrogen. The resulting mixture was heated for 3 hours at 200° C. at a pressure of 160 psig. A mixture of 1.1 g-mole DMI and 2.8 g-mole water was charged to the autoclave. The PPSS polymer was washed with hot (80°–90° C.) water and dried in a vacuum oven at 170° C. overnight. The off-white polymer had an I.V. of 0.36 dL/g and a melt flow of 17 g/10 min.

This example illustrates the preparation of a light-colored PPSS with a very respectable I.V.

That which is claimed is:

1. A process for preparing a poly(arylene sulfide/sulfone) polymer by reacting reactants comprising a dihalo aromatic sulfone with a sulfur-containing compound in the presence of an alkali metal carboxylate and a diluent consisting essentially of a 1,3-dialkyl-2-imidazolidinone, under polymerization conditions.

2. A process in accordance with claim 1 wherein the molar ratio of said 1,3-dialkyl-2-imidazolidinone to said sulfur-containing compound is in the range of 2:1 to 24:1.

3. A process in accordance with claim 2 wherein said 1,3-dialkyl-2-imidazolidinone is 1,3-dimethyl-2-imidazolidinone.

4. A process in accordance with claim 1 wherein said reactants further comprise water.

5. A process in accordance with claim 1 wherein said reactants further comprise a base selected from the group consisting of alkali metal hydroxides, alkali metal carbonates and mixtures thereof.

6. A process in accordance with claim 1, wherein said dihalo aromatic sulfone is bis(p-chlorophenyl) sulfone.

7. A process in accordance with claim 6, wherein said sulfur-containing compound is sodium hydrosulfide.

8. A process in accordance with claim 7 wherein said alkali metal carboxylate is sodium acetate.

9. A process in accordance with claim 8 wherein said 1,3-dialkyl-2-imidazolidinone is 1,3-dimethyl-2-imidazolidinone, and wherein the molar ratio of said 1,3-dimethyl-2-imidazolidinone to said sodium hydrosulfide is in the range of about 4:1 to 16:1.

10. A process in accordance with claim 9 wherein the molar ratio of said bis(p-chlorophenyl) sulfone to said sodium hydrosulfide is in the range of 0.9:1 to 2:1, and the molar ratio of said sodium acetate to said sodium hydrosulfide is in the range of 0.05:1 to 4:1.

* * * * *